(12) United States Patent
Hynes

(10) Patent No.: US 10,960,911 B2
(45) Date of Patent: Mar. 30, 2021

(54) BRAKE DEVICE FOR A TROLLEY

(71) Applicant: Keymed (Medical & Industrial Equipment) Ltd., Southend-on-Sea (GB)

(72) Inventor: John Hynes, Southend-on-Sea (GB)

(73) Assignee: Keymed (Medical & Industrial Equipment) Ltd., Essex (GB)

(*) Notice: Subject to any disclaimer, the term of this patent is extended or adjusted under 35 U.S.C. 154(b) by 0 days.

(21) Appl. No.: 16/356,848

(22) Filed: Mar. 18, 2019

(65) Prior Publication Data
US 2019/0300038 A1 Oct. 3, 2019

(30) Foreign Application Priority Data
Mar. 29, 2018 (GB) .................................. 1805163

(51) Int. Cl.
*B62B 5/00* (2006.01)
*B62B 5/04* (2006.01)
(Continued)

(52) U.S. Cl.
CPC ............ *B62B 5/049* (2013.01); *A61G 12/001* (2013.01); *B62B 3/00* (2013.01); *B62B 5/0442* (2013.01); *B62B 5/0447* (2013.01); *F16D 65/04* (2013.01); *F16M 11/42* (2013.01); *B62B 5/0438* (2013.01); *B62B 2301/044* (2013.01); *F16M 2200/08* (2013.01)

(58) Field of Classification Search
CPC ..... B62B 5/049; B62B 5/0447; B62B 5/0442; B62B 5/0438; B62B 5/04; B62B 1/00; B62B 3/00; B62B 2301/044; B62B 2301/04; A61G 12/001; A61G 12/00; F16D 65/04; F16D 65/00; F16D 65/02
See application file for complete search history.

(56) References Cited

U.S. PATENT DOCUMENTS 2,747,692 A * 5/1956 Holmes ................... B62B 5/049
188/5
3,231,050 A 1/1966 Belyeu
(Continued)

FOREIGN PATENT DOCUMENTS

| GB | 1498022 A | 1/1978 |
|---|---|---|
| KR | 10-2016-0089817 A | 7/2016 |
| WO | WO 2016/125923 A1 | 6/2016 |

OTHER PUBLICATIONS

European Patent Office, Extended European Search Report in in European Patent Application No. 19162216.6, 7 pp. (dated Jul. 29, 2019).
(Continued)

*Primary Examiner* — James M Dolak
(74) *Attorney, Agent, or Firm* — Leydig, Volt & Mayer, Ltd.

(57) ABSTRACT

A trolley for medical equipment includes a base mounted on a plurality of wheels. A brake device including at least one deformable brake pad is located beneath the trolley base. A release mechanism is provided to move the brake pad between a raised position in which it is spaced above a floor surface on which the trolley wheels rest, and a lowered position in which the brake pad is pressed against the floor surface under the weight of the brake device to a exert a braking force on the trolley.

8 Claims, 6 Drawing Sheets

(51) Int. Cl.
*B62B 3/00* (2006.01)
*F16D 65/04* (2006.01)
*F16M 11/42* (2006.01)
*A61G 12/00* (2006.01)

(56) References Cited

U.S. PATENT DOCUMENTS

| | | | | |
|---|---|---|---|---|
| 3,405,783 A | * | 10/1968 | Clark | B60B 33/021 |
| | | | | 188/5 |
| 3,715,015 A | * | 2/1973 | Morris | B60T 1/14 |
| | | | | 188/5 |
| 4,302,025 A | | 11/1981 | Waddell et al. | |
| 4,648,613 A | * | 3/1987 | Hennessy | B62B 5/049 |
| | | | | 188/5 |
| 4,655,466 A | * | 4/1987 | Hanaoka | B62B 3/02 |
| | | | | 108/145 |
| 4,886,286 A | * | 12/1989 | Whorton, III | B62B 3/006 |
| | | | | 280/47.35 |
| 6,860,496 B2 | * | 3/2005 | Novak | B62B 5/049 |
| | | | | 211/20 |
| 10,643,418 B2 | * | 5/2020 | Costa | B62B 5/0433 |
| 10,746,245 B2 | * | 8/2020 | Lee | F16D 66/027 |
| 2015/0203080 A1 | | 7/2015 | Modi et al. | |

OTHER PUBLICATIONS

United Kingdom Intellectual Property Office, Search Report in United Kingdom Patent Application No. 1805163.1, 1 p. (dated Sep. 18, 2018).

* cited by examiner

BRAKE DEVICE FOR A TROLLEY

CROSS-REFERENCE TO RELATED APPLICATIONS

This patent application claims the benefit of United Kingdom Patent Application No. 1805163.1, filed Mar. 29, 2018, which is incorporated by reference.

FIELD OF THE INVENTION

The present invention relates to a brake device for a wheeled trolley. It is particularly suitable for use with a trolley carrying medical equipment, although it is also applicable to other types of trolley.

BACKGROUND OF THE INVENTION

Hospitals and medicals facilities frequently use equipment mounted on trolleys so that it can be easily moved to different locations as required. Examples include trolleys with patient monitoring or diagnostic equipment, trolleys with apparatus for intravenous delivery of medicaments and so on. Typically, such trolleys have a frame mounted on a number of castor wheels, so the direction of trolley movement can be altered easily. Each castor wheel is provided with a brake which may be foot operated by a user. However, engaging and disengaging the brake on each castor wheel is cumbersome and time consuming and in practice, users frequently will not bother to operate the brakes for each, or indeed any, wheel so that the trolley is at least partially mobile even when the equipment is in use. Therefore, there is a risk the trolley may move accidentally, causing injury to a patient or the user or damage to the equipment.

BRIEF SUMMARY OF THE INVENTION

The present invention provides a trolley having a base mounted on a plurality of wheels, and a brake including at least one deformable brake pad located beneath the base of the trolley and a release mechanism operable to move the brake pad between a raised position in which the brake pad is spaced above a floor surface on which the wheels of the trolley rest and a lowered position in which the brake pad is pressed against the floor surface under the weight of the brake device to exert a frictional force inhibiting movement of the trolley across the floor surface.

The brake pad preferably includes a mat with a plurality of deformable elongate projections. The brake device may further include a backing plate with upper and lower surfaces, wherein the brake pad is mounted on the lower surface with the projections extending downwardly and wherein the upper surface is connected to the release mechanism.

Preferably, the release mechanism includes an elongate extension member extending upwardly from the backing plate and a handle operable by a user to raise and lower the elongate extension member.

The release mechanism preferably further includes guide means with end stops to define the raised and lowered positions of the brake device and to guide movement of the handle between the end stops.

Conveniently, the extension member is slideably received within a hollow part of the trolley and the guide means includes a slot formed in the hollow part through which the handle extends.

Biasing means may be provided operable to press the brake pad against the floor surface in the lowered position. The biasing means may include spring means located between a part of the trolley and the brake and configured to bias the brake pad downwardly when it is in the lowered position, or a weight mounted on the release mechanism.

BRIEF DESCRIPTION OF THE DRAWINGS

The invention will now be described in detail, by way of example only, with reference to the accompanying drawings in which.

DETAILED DESCRIPTION OF THE INVENTION

Figure 1:
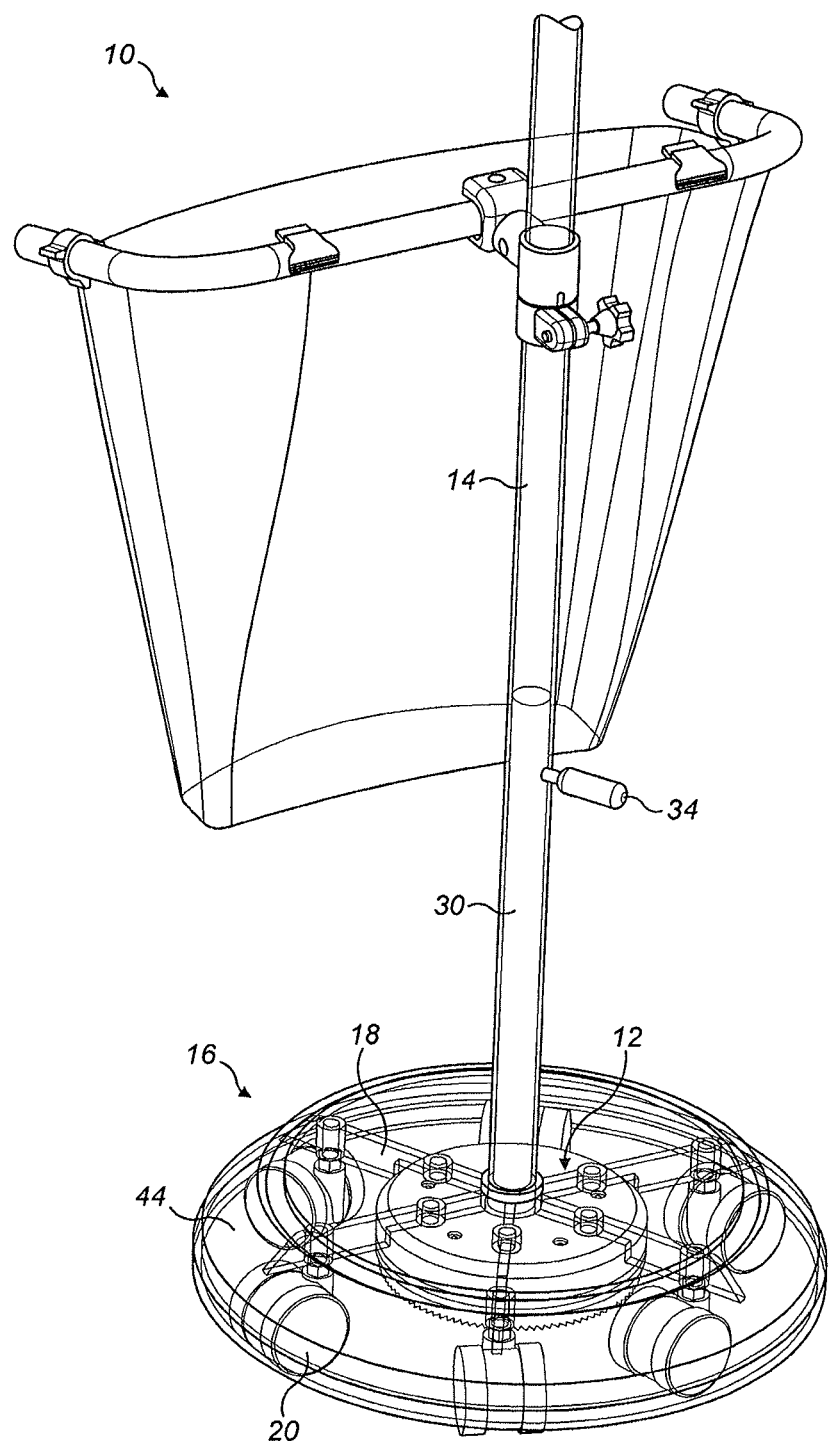
FIG. 1 is a schematic view of part of a typical trolley for medical equipment incorporating a brake device in accordance with the present invention.

FIG. 1 illustrates a typical trolley 10 for medical equipment in which a brake device 12 in accordance with the present invention is incorporated. The trolley 10 in this example has a central upright pole 14, to which medical equipment may be attached, and a base 16 comprising a number of radiating feet 18 each attached to a swivel castor wheel assembly 20. The base 16 is covered by a protective skirt 44 which is described further below. In this figure, the skirt 44 is shown transparent in order to illustrate the components below.

Figure 2:
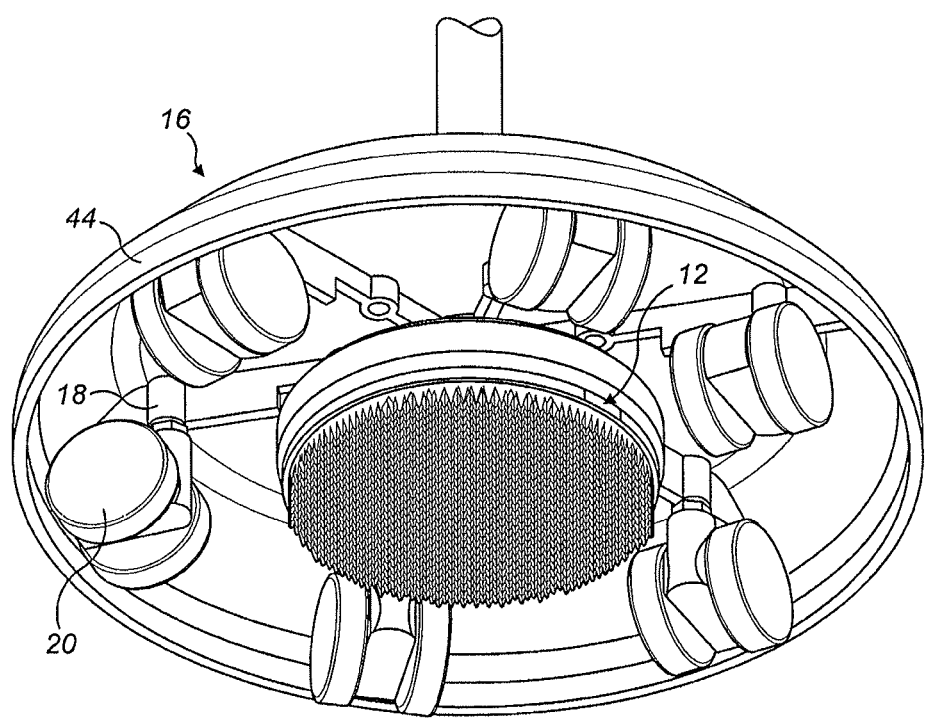
FIG. 2 is a perspective view from below of the trolley base and brake device.
Figure 3:
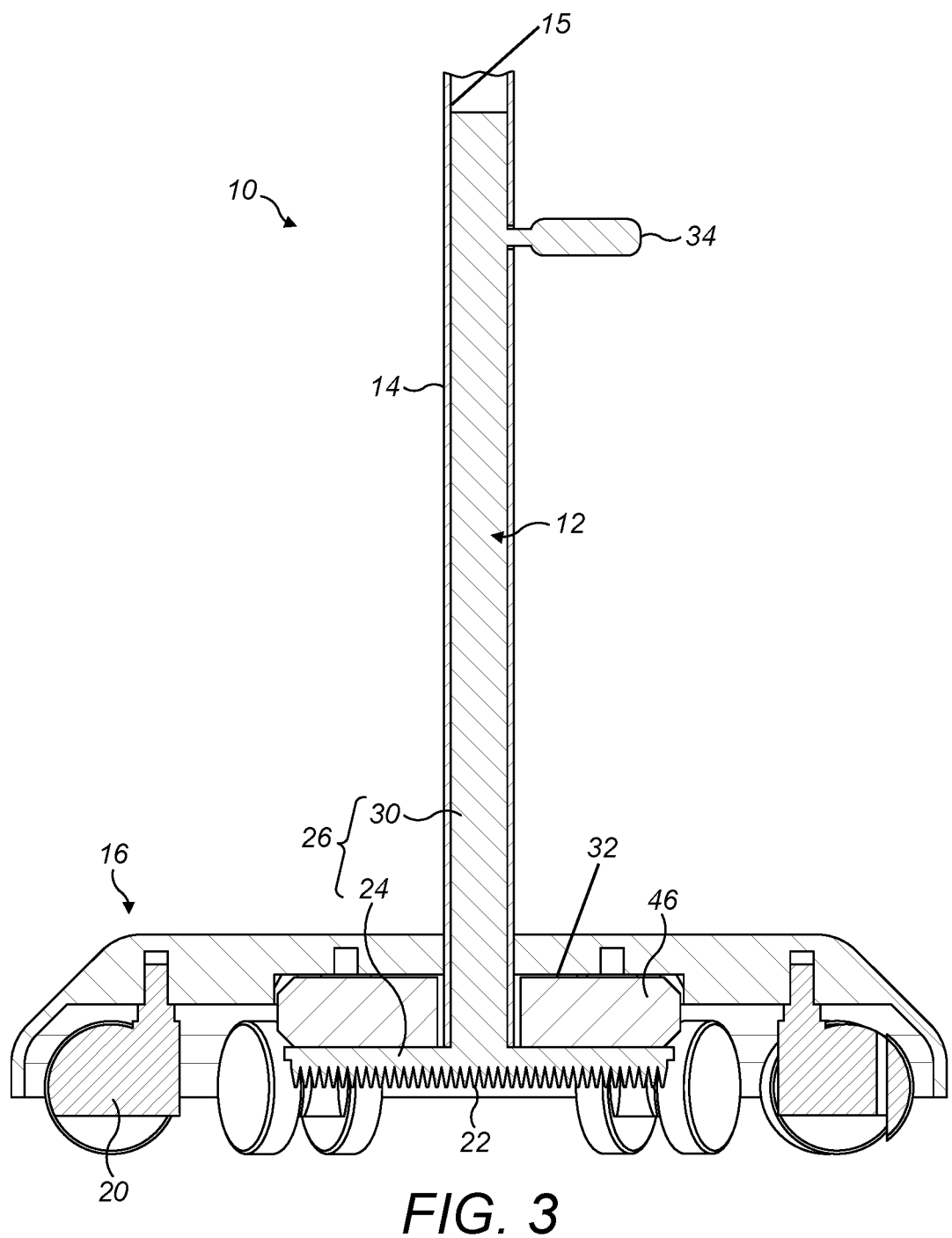
FIG. 3 is a cross-sectional view of the base of a trolley with the brake device in the raised position.
Figure 4:
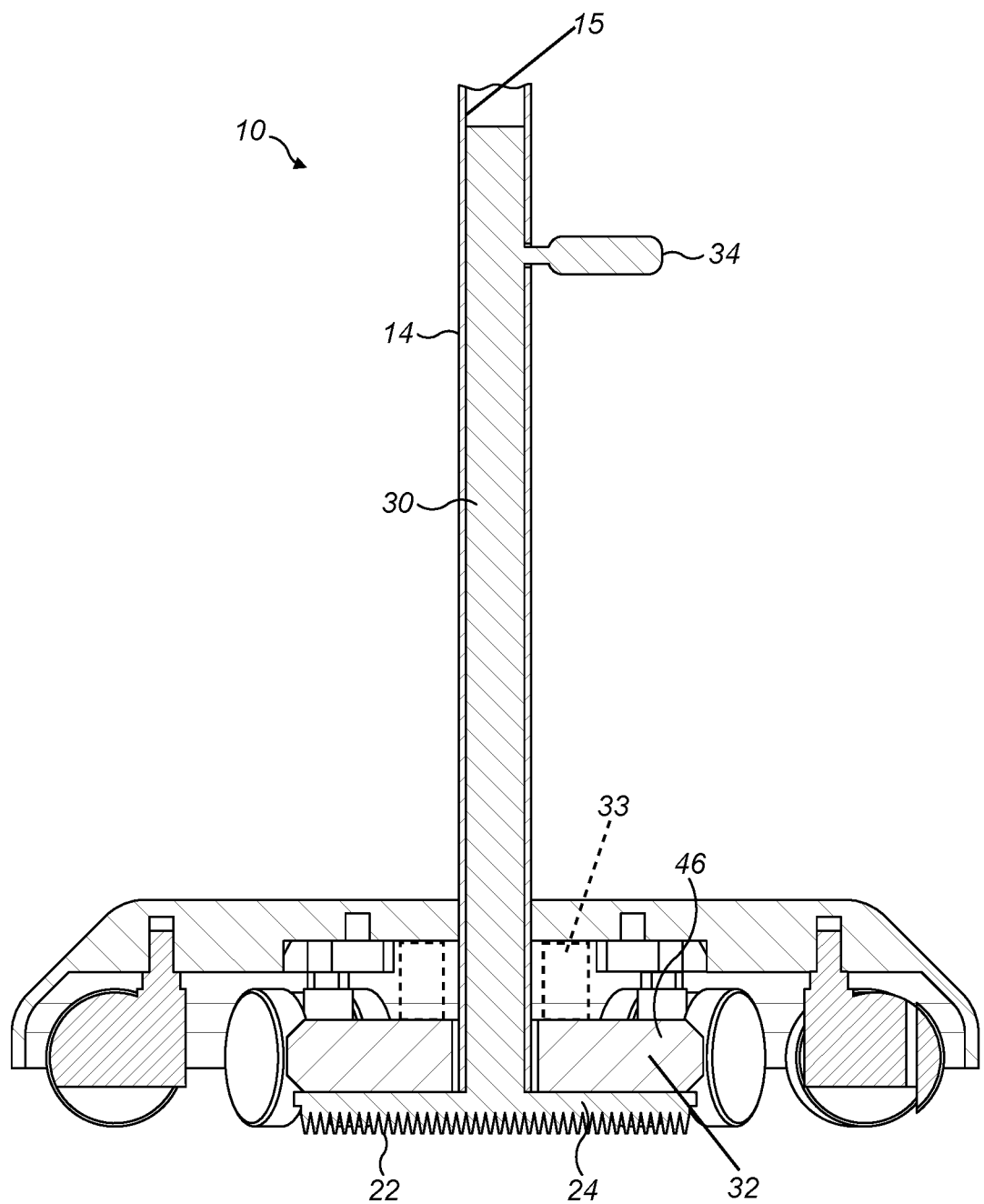
FIG. 4 is a cross-sectional view of the trolley base of FIG. 3 with the brake device in the lowered position.

The brake device 12 comprises a deformable brake pad 22 secured to a release mechanism 26. The brake pad 22 is located substantially centrally beneath the trolley base 16, radially inwardly of the wheels 20 as seen in FIG. 2. In the raised or retracted position, the brake pad 22 is held just beneath the radiating feet 18 and spaced above the floor surface on which the wheels 20 rest, as in FIG. 3. In this position, the trolley 10 can move freely. The release mechanism 26, which is described further below, is operable to lower the brake pad 22 so that it contacts the floor surface to apply a braking force and inhibit or prevent movement of the trolley 10, as shown in FIG. 4.

Figure 5:
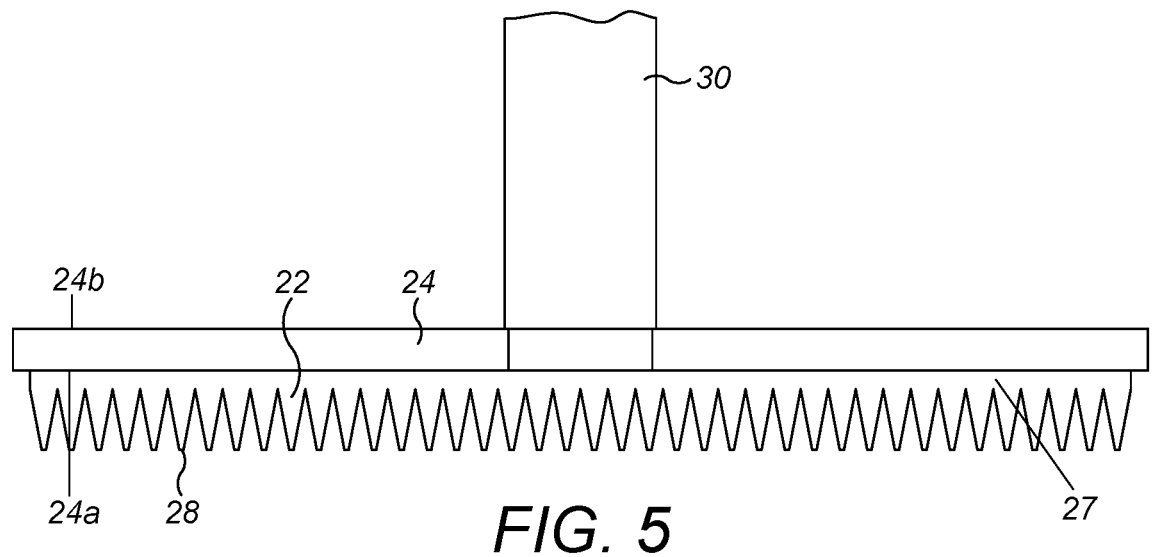
FIG. 5 is a side view of part of the brake device in the raised position.
Figure 6:
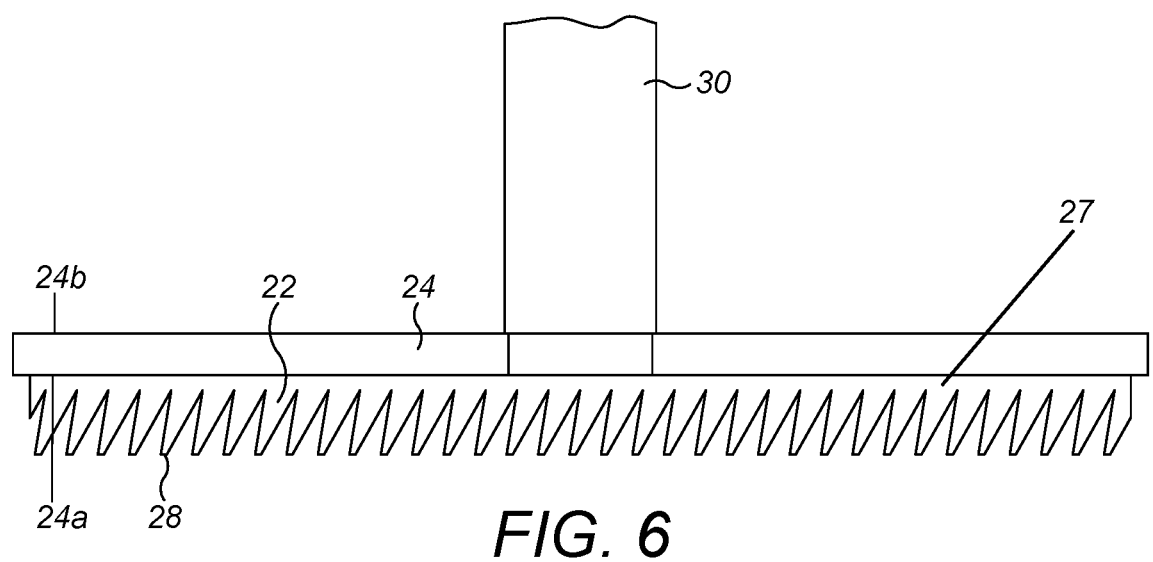
FIG. 6 is a side view of part of the brake device in the lowered position.
Figure 7:
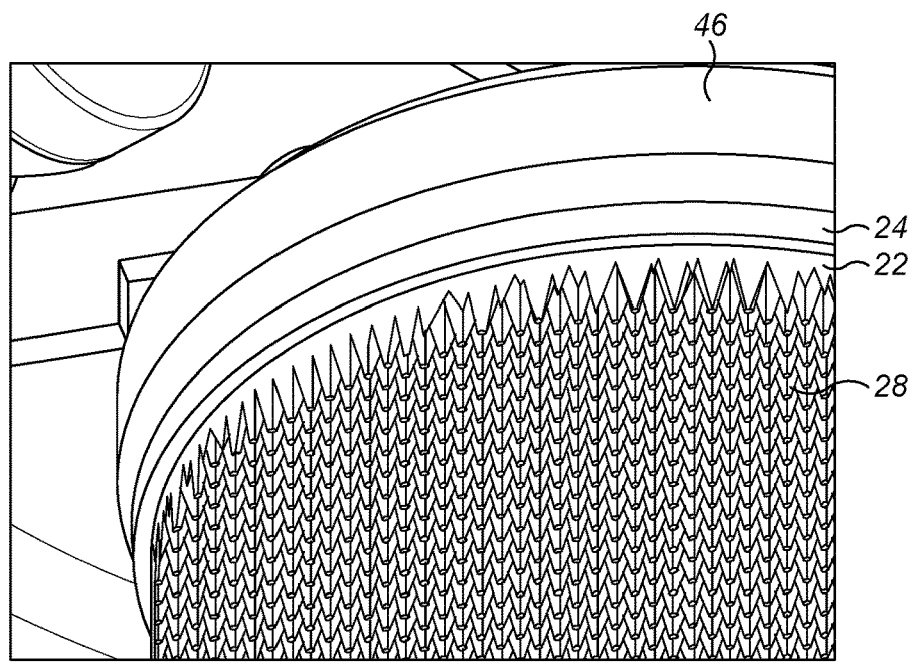
FIG. 7 is a perspective detail view of part of the brake pad viewed from below.

The brake pad 22 is a body of deformable or compressible material with non-slip or high friction properties so that it will resist slipping once it is pressed into contact with another surface. In this example, the brake pad 22 comprises a circular moulded mat 27 with a plurality of projections or fingers 28. The mat is attached to the lower surface 24a of a circular backing plate 24 so that the fingers 28 extend downwardly as shown in FIG. 5. The mat is formed of a flexible elastomeric material such as rubber or silicone. When the brake pad 22 contacts the floor, the fingers 28 deform or bend under the weight of the brake device 12, and optionally an additional biasing means as described further below, as shown in FIG. 6, thereby increasing the surface area in contact with the floor surface, to provide a braking effect on the trolley 10. The fingers 28 may be conical, or pyramid-shaped with a number of flat faces as shown in FIG. 7. However, the shape and dimensions of the fingers 28 may be altered as desired to provide the appropriate flexibility and to give the required braking effect when contacting the floor surface. The brake pad 22 may be formed of any suitable deformable or compressible material, such as a foam or sponge.

The release mechanism 26 comprises the backing plate 24 and an elongate extension member 30 which extends upwardly from an upper surface 24b the backing plate 24. The extension member 30 is preferably slideably received within a hollow part 15 of the central pole 14 of the trolley 10 and can be moved up and down within the pole 14 in order to raise and lower the brake pad 22.

Figure 8:
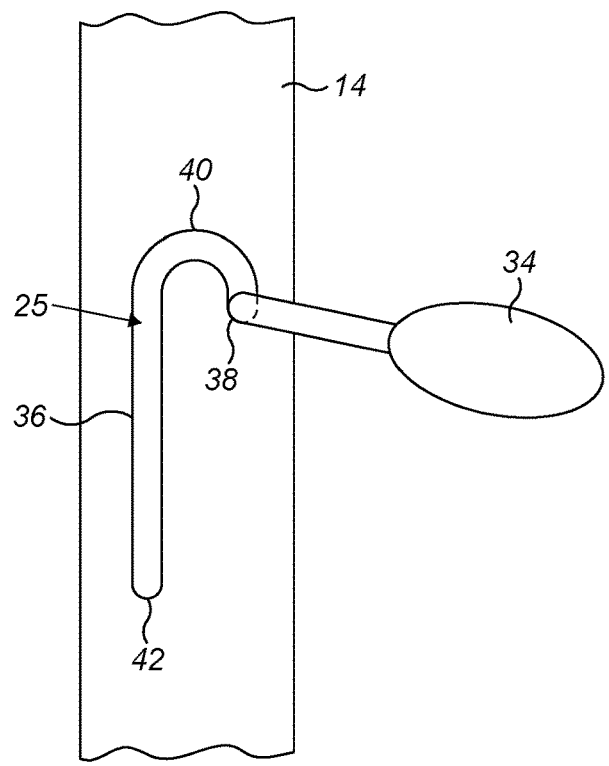
FIG. 8 is an enlarged view of part of the release mechanism.

In this example, the release mechanism 26 may further comprise a handle 34 projecting laterally from an upper region of the extension member 30 through guide means 35 in the form of a slot 36 in the pole 14, as seen in FIGS. 1 and 8. The slot 36 is shaped to hold the handle 34 in an upper position in which the brake pad 22 is raised above the floor, and to allow it to be moved to a lower position in which the brake pad 22 is pressed against the floor. For example, the slot 36 may be in the form of an inverted bayonet fitting or arch shape with one leg of the arch extending further down the pole 14 than the other. When the handle 34 is received in the upper end position 38 of the slot 36 the extension member 30, backing plate 24 and brake pad 22 are held in the raised or retracted position. To release the brake device 12, the handle 34 is lifted over the apex 40 of the slot 36 and moved down to the lower end position 42.

The release mechanism 26 is configured and dimensioned such that in the lowered position, the brake pad 22 is pushed down against the floor surface so that the brake pad 22 will deform or compress and the projecting fingers 28 will bend in order to increase the contact area with the floor in order to exert a significant braking force on the trolley 10. An additional biasing means 32 may be provided to increase the downward force on the brake pad 22. For example, spring means may be provided which pushes downwardly on the extension member 30. Such spring means may be located within the pole 14 between a stop and the top of the extension member 30. Alternatively, spring means 33 may be provided between the base 16 of the trolley 10 and the backing plate 24. In the raised position, the spring means is held in a compressed state and cannot extend because the handle 34 is retained in the upper end 38 of the slot 36. Once the handle 34 is moved to the lower end of the slot, the spring means is able to extend and exert a downward force on the brake pad 22. Alternatively, the weight of the extension member 30 and the backing plate 24 may be sufficient to press the brake pad 22 against the floor, or additional weight may be added. For example, a weight in the form of a heavy disc 46 may be provided on the top of the backing plate 24 as shown in FIGS. 3 and 4. The weight of the disc 46 will depend on the material used for the brake pad 22 and the configuration of the fingers 28 and will be chosen to ensure an optimal amount of friction with the floor surface.

It will be appreciated that many other forms of release mechanism could be employed. The release mechanism should be a simple robust mechanism, which is easily accessible for the user without the need to bend down, and straightforward to operate, to encourage a user to make use of the brake device. Locating the release mechanism 26 within part of the trolley frame is not essential but is advantageous because it minimises the risk of trapping a user's fingers or other items between relatively moving parts of the device. Positioning the brake pad 22 beneath the trolley base and not projecting out beyond the wheels 20 ensures the brake device 12 does not form a trip hazard.

In a further development, a protective skirt 44 may be fitted on the trolley 10 over the base 16 as shown in FIGS. 1-4. This prevents a user tripping over the radiating feet 18 and also prevents cables or other items becoming tangled with the feet 18, the wheels 20 or the brake device 12. The skirt 44 may be a moulded plastic shell which fits over the pole 14 and the base 16 and is dimensioned to sit a few millimetres above the floor surface so that it will not interfere with the rolling action of the trolley 10.

The brake device 12 of the present invention has been described with a single brake pad 22 fitted to a trolley with a single central upright pole 14. However, it will be appreciated that the brake device 12 can be adapted for use with other types of trolley. For larger trolleys with more than one upright and a base covering a larger surface area, more than one brake pad may be provided beneath the trolley base. The release mechanism may be adapted to fit the trolley configuration as required. For example, it may be located in one or more of the uprights, with a suitable linkage to connect the release mechanism to the or each brake pad. It is preferable if a single release mechanism operates all the brake pads, to retain the simplicity of use and encourage a user to apply the brake when required.

Thus, the present invention provides a simple but effective braking device for a trolley, which can be operated by the user in one movement and without bending down, to encourage the user to make use of the brake device when required.

The invention claimed is:

1. A trolley having a base mounted on a plurality of wheels, and a brake device comprising at least one deformable brake pad located beneath the base and a release mechanism operable to move the brake pad between a raised position in which the brake pad is spaced above a floor surface on which the trolley wheels rest, and a lowered position in which the brake pad is pressed against the floor surface under a weight of the brake device to exert a braking force on the trolley, the brake pad including a mat with a plurality of deformable elongate fingers, the plurality of deformable elongate fingers being deformable under the weight of the brake device, and wherein the deformable elongate fingers include flattened tips.

2. The trolley as claimed in claim 1, further comprising a backing plate with upper and lower surfaces, wherein the brake pad is mounted on the lower surface with the deformable elongate fingers depending downwardly and wherein the release mechanism is connected to the upper surface.

3. The trolley as claimed in claim 2, wherein the release mechanism comprises an extension member extending upwardly from the backing plate and a handle operable by a user to raise and lower the extension member.

4. The trolley as claimed in claim 3, wherein the release mechanism further comprises a slot with an upper end position and a lower end position to define the raised and lowered positions and the handle being movable between the upper end position and the lower end position.

5. The trolley as claimed in claim 4, wherein the extension member is movably located within a hollow part of the trolley and the slot is formed in the hollow part through which the handle extends.

6. The trolley as claimed in claim 1, wherein the brake pad is biased against the floor surface in the lowered position.

7. The trolley as claimed in claim 6, further including a spring located between the base of the trolley and the brake device, the spring biasing the brake pad downwardly when it is in the lowered position.

8. The trolley as claimed in claim 6, further including a weight mounted on the release mechanism, the weight biasing the brake pad against the floor surface in the lowered position.

* * * * *